US007956795B2

(12) United States Patent
Bruno et al.

(10) Patent No.: US 7,956,795 B2
(45) Date of Patent: Jun. 7, 2011

(54) TRANSMISSION SCHEDULING FOR ADS-B GROUND SYSTEMS

(75) Inventors: Ronald Bruno, Arlington, VA (US); Boris Veytsman, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 863 days.

(21) Appl. No.: 11/928,267

(22) Filed: Oct. 30, 2007

(65) Prior Publication Data

US 2009/0111465 A1 Apr. 30, 2009

(51) Int. Cl.
*G01S 13/91* (2006.01)

(52) U.S. Cl. .......................................................... 342/36

(58) Field of Classification Search .................... 342/36; 455/431

See application file for complete search history.

(56) References Cited

U.S. PATENT DOCUMENTS

| | | | | |
|---|---|---|---|---|
| 6,567,043 B2 * | 5/2003 | Smith et al. | .................. | 342/456 |
| 6,633,259 B1 * | 10/2003 | Smith et al. | .................. | 342/456 |
| 6,806,829 B2 * | 10/2004 | Smith et al. | .................. | 342/456 |
| 2009/0111465 A1 * | 4/2009 | Bruno et al. | .................. | 455/431 |

FOREIGN PATENT DOCUMENTS

EP 2056272 A2 * 5/2009

* cited by examiner

*Primary Examiner* — Dan Pihulic

(74) *Attorney, Agent, or Firm* — Edell, Shapiro & Finnan, LLC

(57) ABSTRACT

System and methods for reducing redundant messages broadcast in an Automatic Dependent Surveillance-Broadcast (ADS-B) system. For a given target, a controller determines the relevant customers that should receive information about the target, identifies all of the ground stations that can be satisfactorily heard by the relevant customers, and then identifies a smaller subset of ground stations by selecting only those ground stations that are needed to reach all of the relevant customers. ADS-B messages are then broadcast to the relevant customers using only the smaller subset of ground stations.

37 Claims, 9 Drawing Sheets

| $TARGET_1$ | $TARGET_2$ |
|---|---|
| $CUSTOMER_1$ | $CUSTOMER_1$ |
| $CUSTOMER_2$ | $CUSTOMER_3$ |
| $CUSTOMER_3$ | |

FIG.4

| $GS_1$ | $GS_2$ | $GS_3$ |
|---|---|---|
| $CUSTOMER_1$ | $CUSTOMER_1$ | $CUSTOMER_3$ |
| $CUSTOMER_2$ | $CUSTOMER_2$ | $CUSTOMER_4$ |
| $CUSTOMER_3$ | | |

FIG.6

Timing of (k, N) Algorithms

TRANSMISSION SCHEDULING FOR ADS-B GROUND SYSTEMS

FIELD OF THE INVENTION

The present invention relates to air traffic control, and more particularly to systems and methods related to Automatic Dependent Surveillance-Broadcast (ADS-B) transmissions.

BACKGROUND OF THE INVENTION

ADS-B is an emerging air traffic control system that can augment or even replace conventional radar systems. ADS-B uses conventional Global Navigation Satellite System ("GNSS") technology and employs relatively simple broadcast communications links. For a given aircraft, precise position information from the GNSS is combined with other aircraft information such as speed, heading, altitude, and flight number. This combined data (collectively "information") is then simultaneously broadcast to other ADS-B capable aircraft and ground stations or satellite transceivers, which may further relay the information to Air Traffic Control ("ATC") centers, and/or back to other ADS-B capable aircraft. Typically, an ADS-B system comprises a plurality of interconnected ground stations for receiving and re-broadcasting information regarding individual aircraft or planes.

As noted, and as shown in FIG. 1, in an ADS-B system information about the location and other "discretes" (e.g., speed, heading, altitude, etc.) of planes (known as "targets") may be collected by multiple ground stations. The information may be gathered from transmissions received directly from of a target itself (when the target has the necessary equipment) or from other surveillance systems such as legacy radars. The ground stations exchange the information through terrestrial or radio links and then the ground stations broadcast messages about the current target position and discretes to ADS-B capable aircraft (known as "customers").

For the system to perform effectively, it is critical for customers to receive up-to-date and timely broadcasts about targets. However, the ADS-B broadcast spectrum is very crowded, resulting in increased interference and overall lower quality of reception for customers.

The current state of the art with respect to ground station message broadcasting is described in several patents assigned to Rannoch Corporation, including U.S. Pat. No. 6,567,043 B2, U.S. Pat. No. 6,633,259 B1, and U.S. Pat. No. 6,806,829 B2. These patents describe a technique whereby a system sends to each customer broadcasts through a ground station with the best reception at the customer. Such a ground station may be in the line of sight of the customer, may have the best probability of reception at the given customer, or may simply be the closest to the customer.

A significant shortcoming of the broadcast scheduling described in these patents is the potential for a high level of broadcast duplication. More specifically, with reference to FIG. 1, suppose ground station 110*a* has the best reception at customer 105*a*, while ground station 110*b* has the best reception at customer 105*b*, but station 110*b* can be received by customer 105*a*. In the prior art scheme, both ground stations 110*a* and 110*b* broadcast the same message. Given, for example, a crowded airport space and the operation of existing ADS-B message broadcasting techniques, the level of duplication might be quite high, thus decreasing the overall quality of air traffic communications.

There is therefore a need to improve ADS-B infrastructure, and particularly the infrastructure related to ground station message transmissions or broadcasts.

SUMMARY OF THE INVENTION

In accordance with embodiments of the present invention, the number of ground station-broadcasted messages is kept to a minimum using at least one of several different methodologies. Although fewer messages may be broadcast compared to prior art techniques, information about targets is nevertheless still provided to all customers.

Prior attempts to reduce the number of ground station-broadcasted messages have paired customers and ground stations based on a best reception algorithm. That is, the ground station that provides the best reception for a given customer is designated to broadcast ADS-B massages to that customer. Other grounds stations need not broadcast the same messages. Oftentimes, the ground station that is closest to the customer will end up being the designated ground station for that customer. Instead of this approach, for each customer embodiments of the present invention separate ground stations into two groups: a first group that includes ground stations that have a satisfactory reception at the customer, and a second group that includes the remaining ground stations that do not have satisfactory reception at the customer. In accordance with general principles of the present invention, a customer should receive broadcasts from the ground stations in the first group only and, moreover, receive broadcasts only about targets that are relevant to that customer.

In accordance with features of the present invention, for each target it is determined which customers are relevant for this target. That is, it is determined which customers should receive the messages about this target (since not all customers necessarily need to know about all targets being tracked). An appropriate set of ground stations to broadcast these messages is then determined. An optimized set of ground stations should preferably satisfy two criteria:

1. Each relevant customer can receive broadcasts from at least one ground station in the set of ground stations,
2. The number of ground stations in the set of ground stations is minimal.

Since the respective optimal sets of ground stations for different targets are independent of each other, the search for optimal sets for different targets may be performed in parallel, thus reducing the total working time of the methodology. The search for an optimal set is preferably performed quickly since the situation in a typical air traffic control application constantly changes. More specifically, and by way of example only, assuming a 15 nautical mile safety zone around a customer and a speed of 500 knots, 15*60/500=1.8 minutes for a complete change of vicinity. Thus the search for an optimal set is preferably on the order seconds to one to two minutes.

Embodiments of the present invention provide several possible approaches for calculating sets of ground stations: a relatively slow technique that is guaranteed to find the best solution, a much faster technique that finds a good (but not necessary the best) solution, and a series of intermediate techniques that trade speed for optimality in various degrees. Depending on the number of ground stations, one can implement the slow technique, the faster technique, or an adaptive methodology that determines, on each iteration, a best (or most desirable) strategy to continue the search.

These techniques significantly decrease the duplication of broadcasts inherent in the current state of the art, and therefore improve the quality of air control communications.

These and other features of the several embodiments of the invention along with their attendant advantages will be more fully appreciated upon a reading of the following detailed description in conjunction with the associated drawings.

BRIEF DESCRIPTION OF THE DRAWINGS

FIG. 4 shows exemplary lists of relevant customers resulting from the series of steps in FIG. 3.

FIG. 6 shows exemplary lists of customers resulting from the series of steps in FIG. 5.

DETAILED DESCRIPTION

Figure 1:
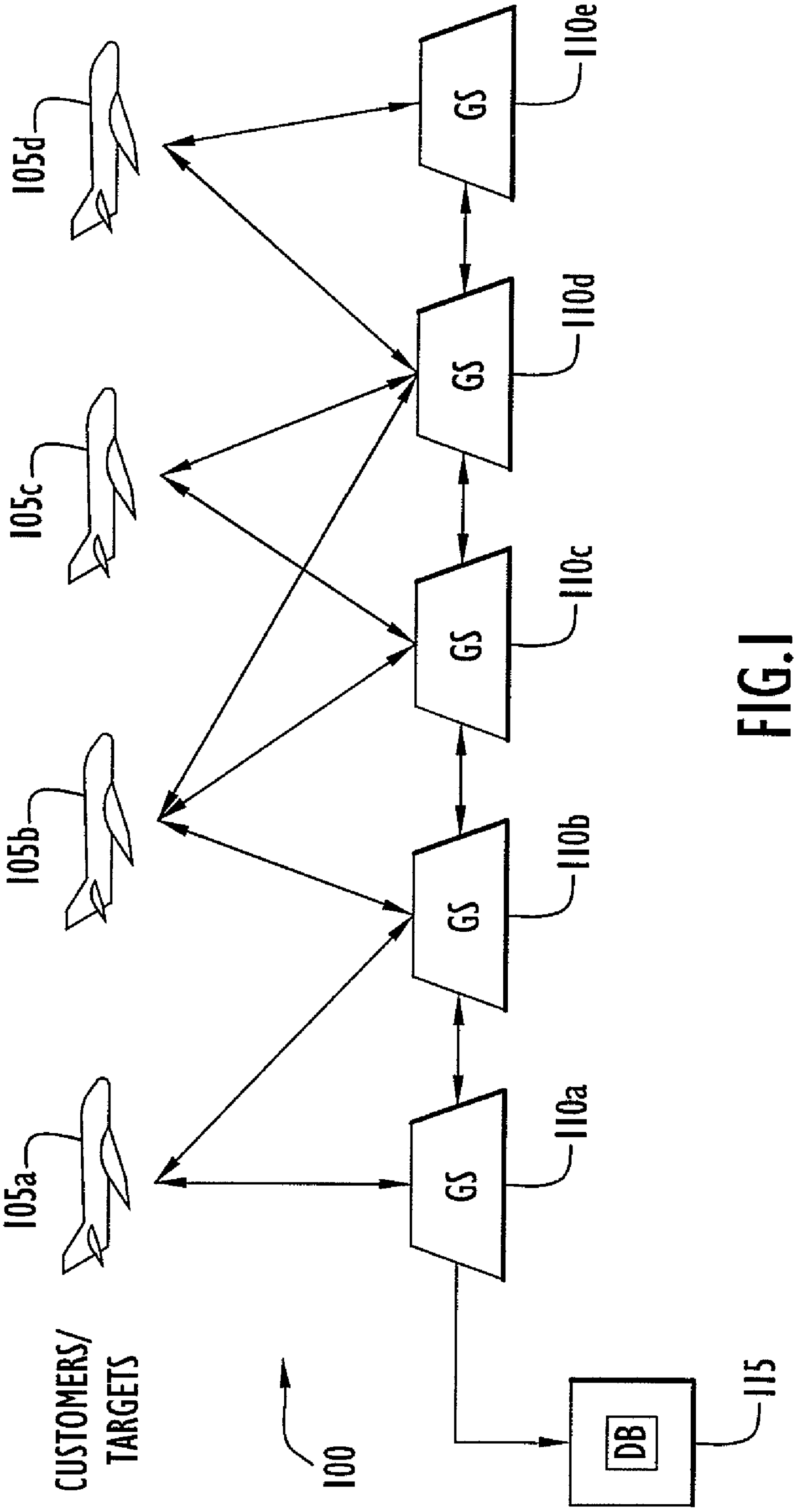
FIG. 1 is a diagram depicting, at a high level, an ADS-B system including targets, customers and interconnected grounds stations that may operate in accordance with embodiments of the present invention.

FIG. 1 is a diagram depicting, at a high level, an ADS-B system including aircraft 105*a-d* where each aircraft may be either or both a target (an aircraft about which information is desired) and a customer (an aircraft that receives information about targets) of the ADS-B system 100. Ground stations 110*a-e* receive position and discretes information about targets and broadcast ADS-B messages comprising that information to customers. As shown, ground stations 110*a-e* are interconnected with one another such that they can share information with one another and be controlled by a controller 115 (which may also include a database, as shown). Controller 115 is preferably a computer connected via well-known network protocols to the plurality of ground stations 110*a-e*.

As shown in FIG. 1, it is possible that a customer may receive broadcasts from several ground stations. However, it is inefficient for multiple ground stations to broadcast the same message for a given customer when a single ground station may be able to provide sufficient broadcast capability to that customer. In accordance with embodiments of the present invention and in an effort to minimize interference and excessive ground station broadcast duplication or redundancy, a decision is made regarding which ground station 110*a-e* should broadcast which message.

Target Parallelization

For each target the methodology in accordance with embodiments of the present invention independently chooses the customers to be notified about the target, and the set of ground stations to broadcast the messages about the target. In this way the calculations may be performed in parallel for each target.

More specifically, when a target enters controlled air space, an instance of the methodology is preferably started. The target is tracked or followed and, periodically, an optimal set of ground stations to broadcast messages about the target is calculated, or recalculated. The instance of the methodology for a given target is terminated when that target permanently leaves the controlled air space, e.g., after landing, or after being handed over to another system, or after entering uncontrolled air space.

The following describes in still more detail the operation of an instance of the methodology of the present invention.

Choosing Customers and an Initial Set of Ground Stations

The technique in accordance with embodiments of the present invention periodically determines the set of relevant customers, i.e., the ones that should be notified about a given target's location, direction, speed and other data according to the traffic control rules. The technique then determines the set of ground stations that can be received by these customers. The goal of the subsequent operation of the technique is to whittle down this set of ground stations to a minimal one, but a set that still covers all of the relevant customers.

Figure 2:
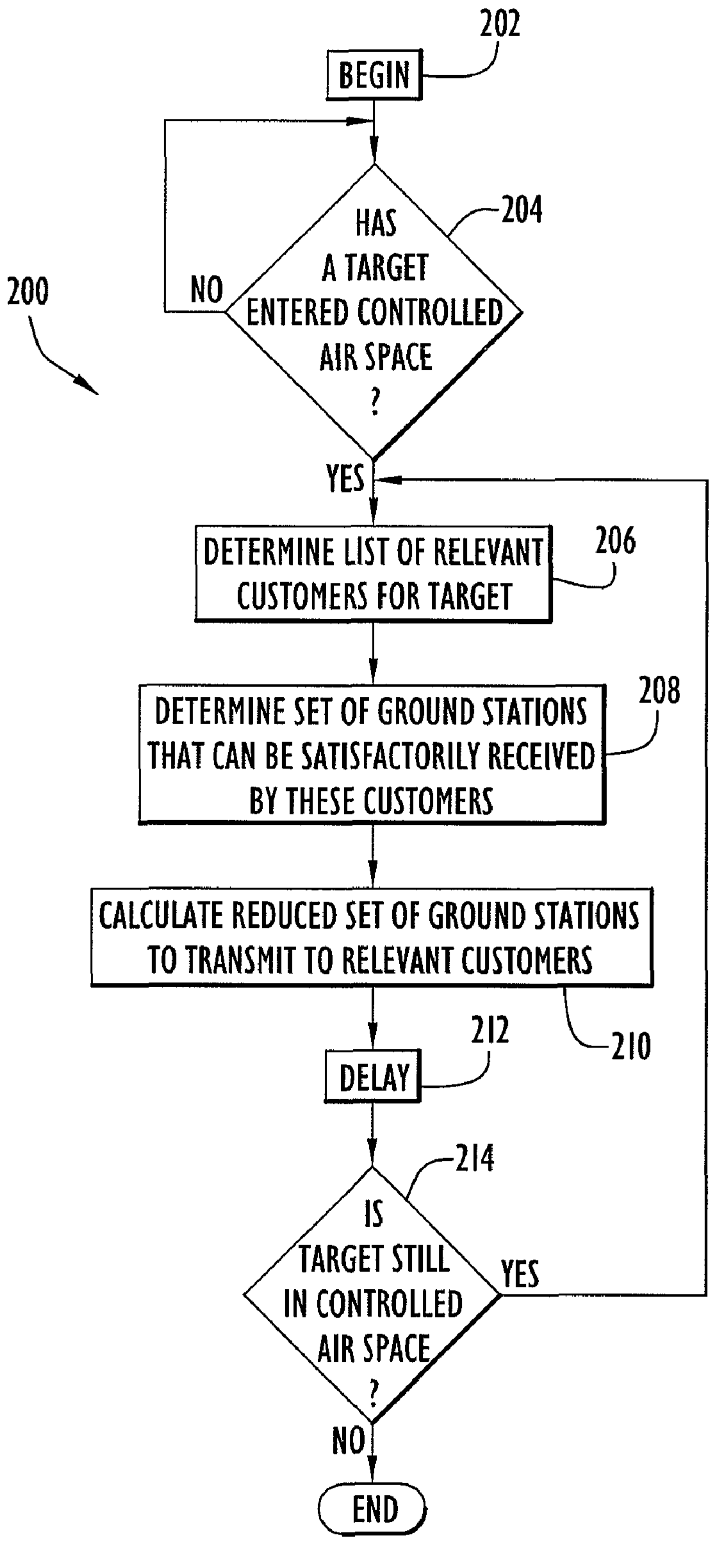
FIG. 2 is an exemplary series of steps in accordance with an embodiment of the present invention.

FIG. 2 depicts an exemplary series of steps 200 for implementing the technique outlined above. A process 200 begins at step 202 and represents an instantiation of the technique or process for a given target. More specifically, at step 204 it is determined whether a new target has entered into controlled air space. If not, the process 200 returns to step 204. In other words, step 204 is a threshold step for launching an instance of the process 200 for a given target. Determining whether a target has entered a given air space can be accomplished by receiving an ADS-B transmission from the target, detecting the target using radar, or any other suitable means available.

As noted previously, not all customers necessarily need to know about every potential target that has entered in the controlled air space, or about every potential target that is currently being tracked in the controlled air space. Consequently, at step 206, a list of relevant customers for the new target is generated. Such a list comprises one or more customers that have an interest in the information about a given target.

Figure 3:
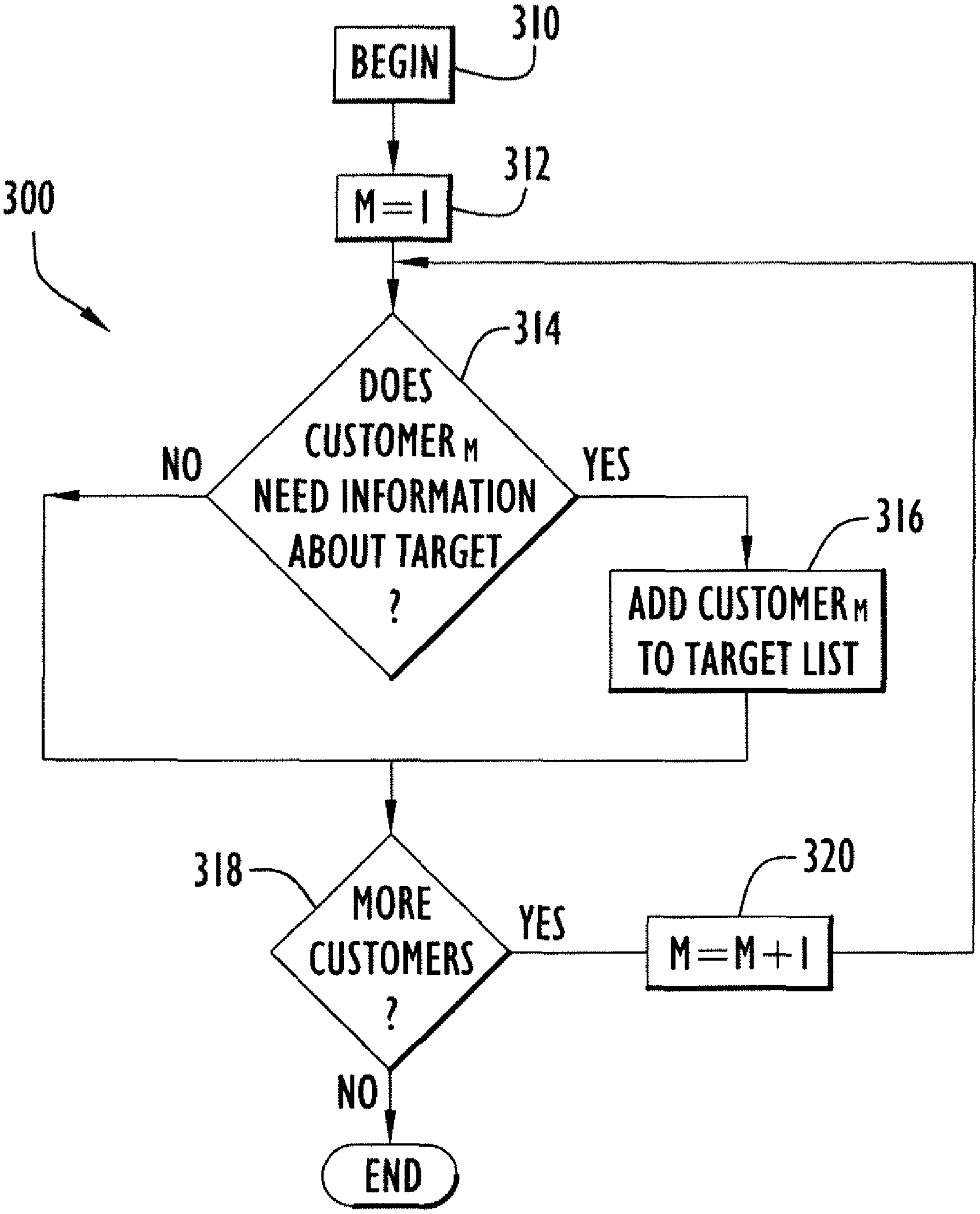
FIG. 3 shows an exemplary series of steps for determining relevant customers in accordance with an embodiment of the invention.

FIG. 3 shows one method by which step 206 may be implemented. As shown, a process 300 begins at step 310 and thereafter, at step 312, a customer identifier M is initialized to 1. At step 314 it is determined whether $customer_M$ needs information about the target, i.e., it is determined if $customer_M$ is relevant with respect to the target. If the customer is relevant, then that customer is added to the target's relevant customer list at step 316. One criterion that may be used to determine whether a given customer needs information about a given target is to establish an imaginary cylinder around a customer 2000 feet in height and 30 nautical miles in diameter with the customer located in the middle of this "cylinder." Any targets that are contained within the cylinder may be considered relevant for the customer. FIG. 4 shows two targets' relevant customer lists that may be generated in accordance with process 300. These lists may be stored in a database that is part of a computer control system that performs the various steps described herein. For example, controller (and associated database) 115 (as shown in FIG. 1) may be configured to be in communication with the several ground stations 110*a-e* and be configured to run software consistent with the various processes described herein. Alternatively, controller 115 and database may be incorporated into any one or more of the ground stations 110*a-e*, i.e., the controller and database functionality may be distributed.

Referring again to FIG. 3, it is then determined at step 318 whether there are more customers to consider. If there are none, then process 300 ends. Otherwise, customer identifier M is incremented and the process returns to step 314. If at step 314 it is determined that $customer_M$ is not relevant with respect to the target, then process 300 jumps immediately to step 318 to determine whether more customers need to be considered, as already explained.

Referring back to FIG. 2, after relevant customers are determined, process 200 proceeds to step 208 during which the set of ground stations that can satisfactorily be received by the relevant customers is determined. Systems and methods for determining, e.g., satisfactory transmission signal levels are well-known to those skilled in the art and need not be described here. Suffice it to say that there exists communications infrastructure that allows customers to communicate with ground-based systems that may be used to confirm the reception (or lack thereof) of selected transmissions. In any event, in accordance with embodiments of the present invention, it is preferable that ground stations that cannot be heard by selected customers need not make message transmissions intended for those customers, thereby reducing the amount of (unnecessary) communications traffic.

Figure 5:
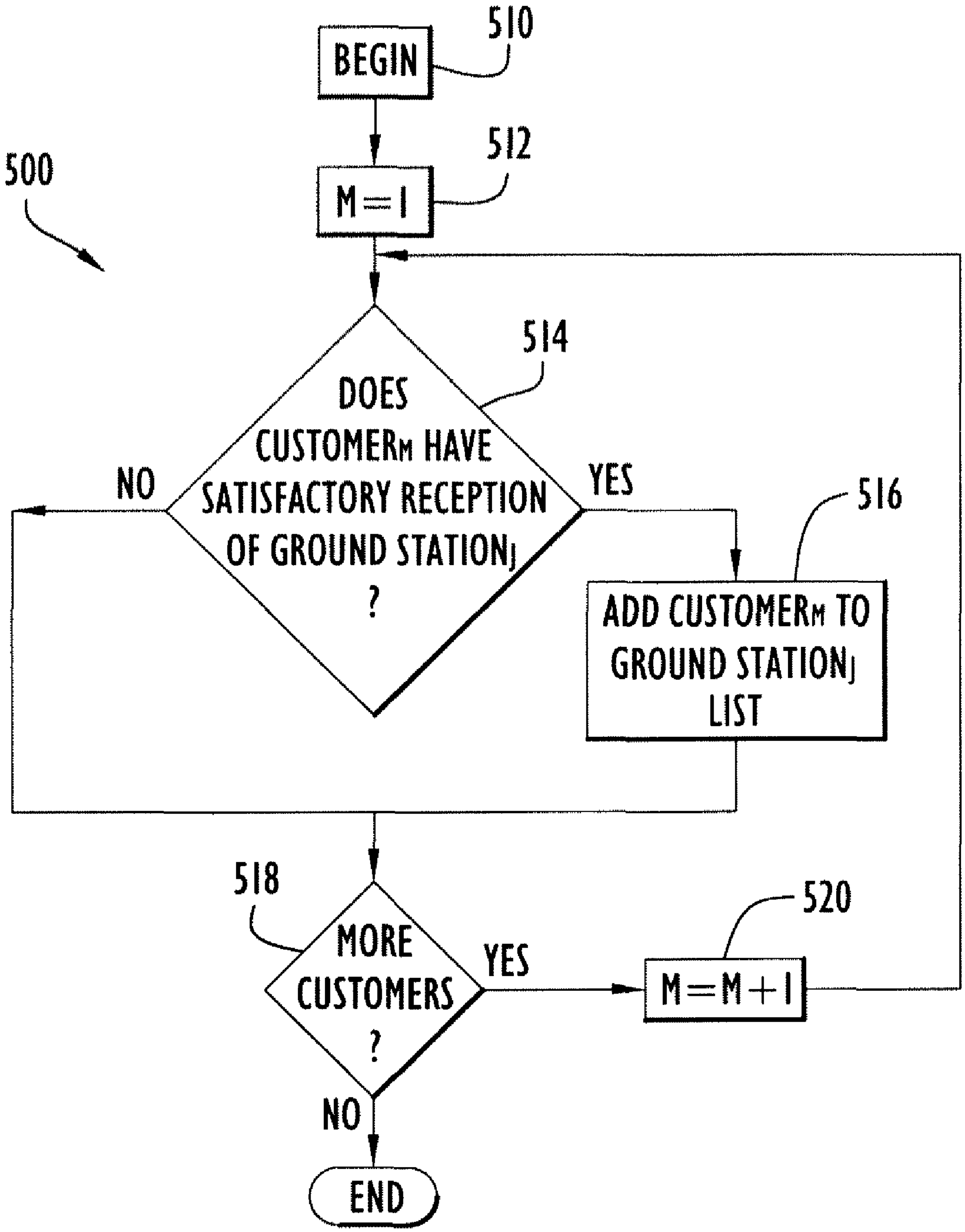
FIG. 5 shows an exemplary series of steps for establishing a set of ground stations that have satisfactory reception at a given customer.

FIG. 5 shows one method by which step 208 may be implemented. As shown, a process 500 begins at step 510 and thereafter, at step 512, a customer identifier M is initialized to 1. At step 514 it is determined whether $customer_M$ has satisfactory reception of a ground station J, i.e., it is determined if $customer_M$ can satisfactorily hear ground station J. If $customer_M$ can satisfactorily hear ground station J, then $customer_M$ is added to a list of customers that can satisfactorily hear ground station J, as indicated by step 516. FIG. 6 shows three exemplary ground station customer lists that may be generated in accordance with process 500. These lists may likewise be stored in controller 115 and its associated database.

Referring again to FIG. 5, it is then determined at step 518 whether there are more customers to consider. If there are none, then process 500 ends. Otherwise, customer identifier M is incremented and the process returns to step 514. If at step 514 it is determined that $customer_M$ cannot satisfactorily receive data from ground station J, then process 500 jumps immediately to step 518 to determine whether more customers need to be considered, as previously explained.

With the multiple target relevant customer lists of FIG. 4 and the multiple ground station customer reception lists of FIG. 6 in hand, process 200 (FIG. 2) continues with step 210 where a reduced set of ground stations is calculated using one of several possible methods, as described in more detail below. Accordingly, after the completion of step 210, not only has the set of potential transmitting ground stations been reduced by eliminating ground stations that cannot be heard by customers, but the number of ground stations in the set of ground stations is also further optimized and, importantly, almost certainly reduced in size.

Again with reference to FIG. 2, a delay, at step 212, may then be introduced. This delay could be on the order seconds or minutes in view of the speed and/or heading of a given target. Of course, the delay of step 212 might be eliminated entirely where a constant, real-time update for the given target may be desired or warranted. Finally, at step 214, it is determined whether the target remains in the controlled air space. If not, then process 200 ends with regard to that target. If, at step 214, it is determined that the target is still in the controlled air space, then process 200 returns to step 206 to re-determine a list of relevant customers for the target, as one or more customers may no longer need information about the target. The process then proceeds as described above.

Embodiments of the present invention provide several different methodologies via which step 210 of FIG. 2—reducing the number of needed ground stations—may be executed.

Choosing an Optimal or a Suboptimal Set of Ground Stations

Embodiments of the present invention provide several possible techniques to choose an optimized (or just good enough) set of ground stations with minimal message broadcast duplication. These techniques represent a tradeoff between speed and optimality, i.e., the slower the technique, the better the solution. The choice of an appropriate tradeoff may be based on design consideration such as the congestion of the given controlled air space, cost, allowable margin of error, geographic distribution of ground stations, air traffic control regulations, among others.

Each technique begins with the set of customers and ground stations determined from the processes described above and outputs a subset of ground stations to broadcast the messages for the given target with low or no duplication.

An "Optimal" Technique

Figure 7:
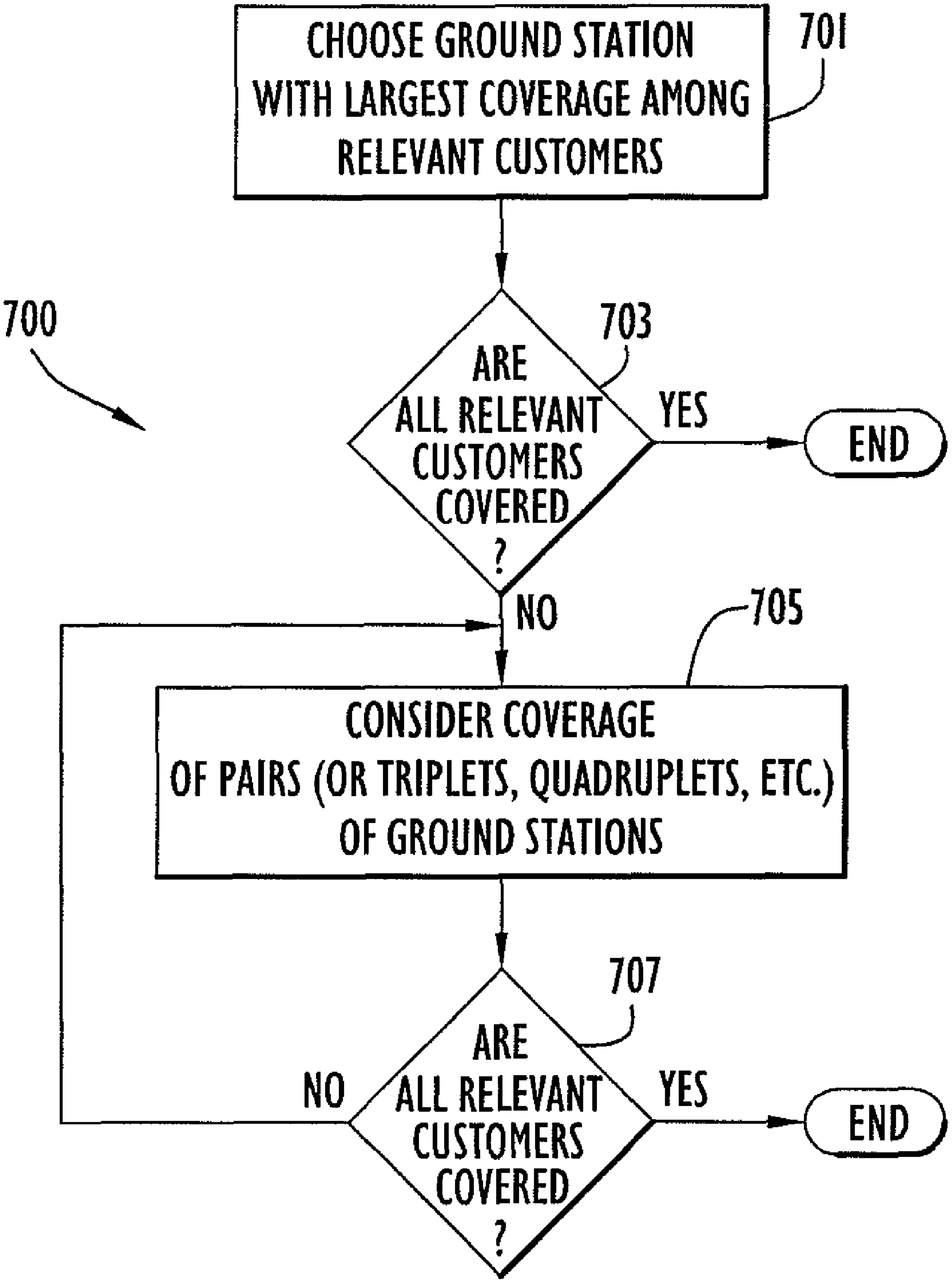
FIGS. 7-9 illustrate techniques for reducing the number of ground stations for broadcasting messages to customers in accordance with embodiments of the present invention.

An optimal (or brute force) technique is described with reference to FIG. 7. As shown, a process 700 begins at step 701 wherein a ground station with a largest coverage among relevant customers is chosen. If, at step 703, it is determined that all relevant customers are covered by this one ground station, then a solution is deemed to have been found and the process ends.

If, on the other hand, not all relevant customers are covered by the one ground station, then at step 705, the process considers combined customer coverage for pairs of ground stations. The ground station pair with the largest coverage is then selected. If that pair covers all relevant customers at step 707 then the problem is considered solved, i.e., in such a case, all relevant customers are covered by only two (i.e., a pair of) ground stations.

If not all customers are covered by the pair, then step 705 is repeated, but this time triplets of ground stations are considered. The process continues, as necessary, with quadruplets, quintuplets, etc. until all relevant customers are covered. Of course, it is possible that all ground stations may be needed to cover all customers, but it is likely that a reduced set of ground stations will result from process 700.

This "optimal" technique provides the best set of ground stations for the working time proportional to $$Q_{bf}(N) = N + \frac{N(N-1)}{2!} + \frac{N(N-1)(N-2)}{3!} + \ldots 2^N \qquad (1)$$

Or, $$Q_{bf}(N) = 2^N$$

where N is the number of ground stations in the initial set.

If N=10, then $Q_{bf}(10)=2^{10}$ or about 1000 steps, i.e., the number of times a list of planes or aircraft covered by a given station or pair of stations, etc., is constructed. However, one skilled in the art will appreciate that this number will grow significantly as the number of ground stations increases. As such, this technique might not be suitable where there is a relatively large number of ground stations.

A "Fast" Technique

Figure 8:
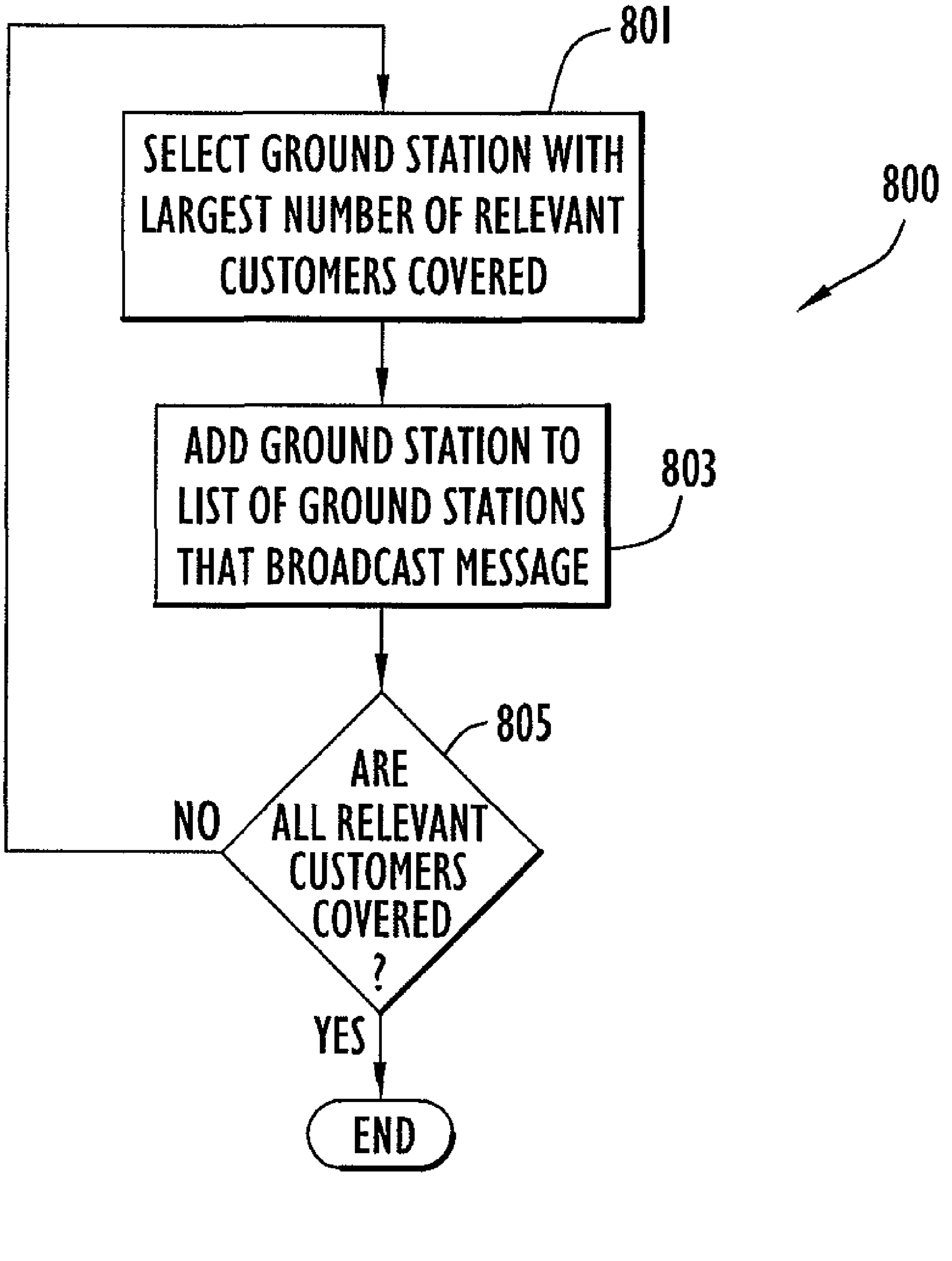

The "fast" technique is described with reference to FIG. 8. As shown, a process 800 begins with step 801 wherein the ground station with the largest number of relevant customers covered is selected. That ground station is then added to a list of ground stations that are to broadcast the message about the target, as indicated by step 803. If, at step 805, all relevant customers are covered by the ground station so listed, process 800 ends. Otherwise, as shown, process 800 loops back to step 801 where a next ground station, from among the remaining ground stations, that covers the largest number of customers is selected and added to the list of ground stations. The process continues until all relevant customers have been covered.

In this technique, if N is the number of ground stations, then N comparisons are needed to select the first ground station, N−1 to select the second one, etc. The total number of steps is $$Q_{fast}(N)=N+(N-1)+(N-2)+\ldots \quad (2)$$

Or, $$Q_{fast}(N)=\frac{N(N+1)}{2}$$

An "Intermediate" Technique

The "optimal" or brute force technique described earlier guarantees the best result, but may be slow. The "fast" technique described above is relatively fast, but is not guaranteed to give the best result. As a compromise, embodiments of the present invention also provide a family of intermediate techniques, dependent on a parameter (search depth) k. At k=N (the number of ground stations in the initial set) this family is equivalent to the "optimal" technique, and at k=1 it is equivalent to the "fast" technique. Thus, the larger is k, the more optimal is the result, but the slower is the overall process.

Figure 9:
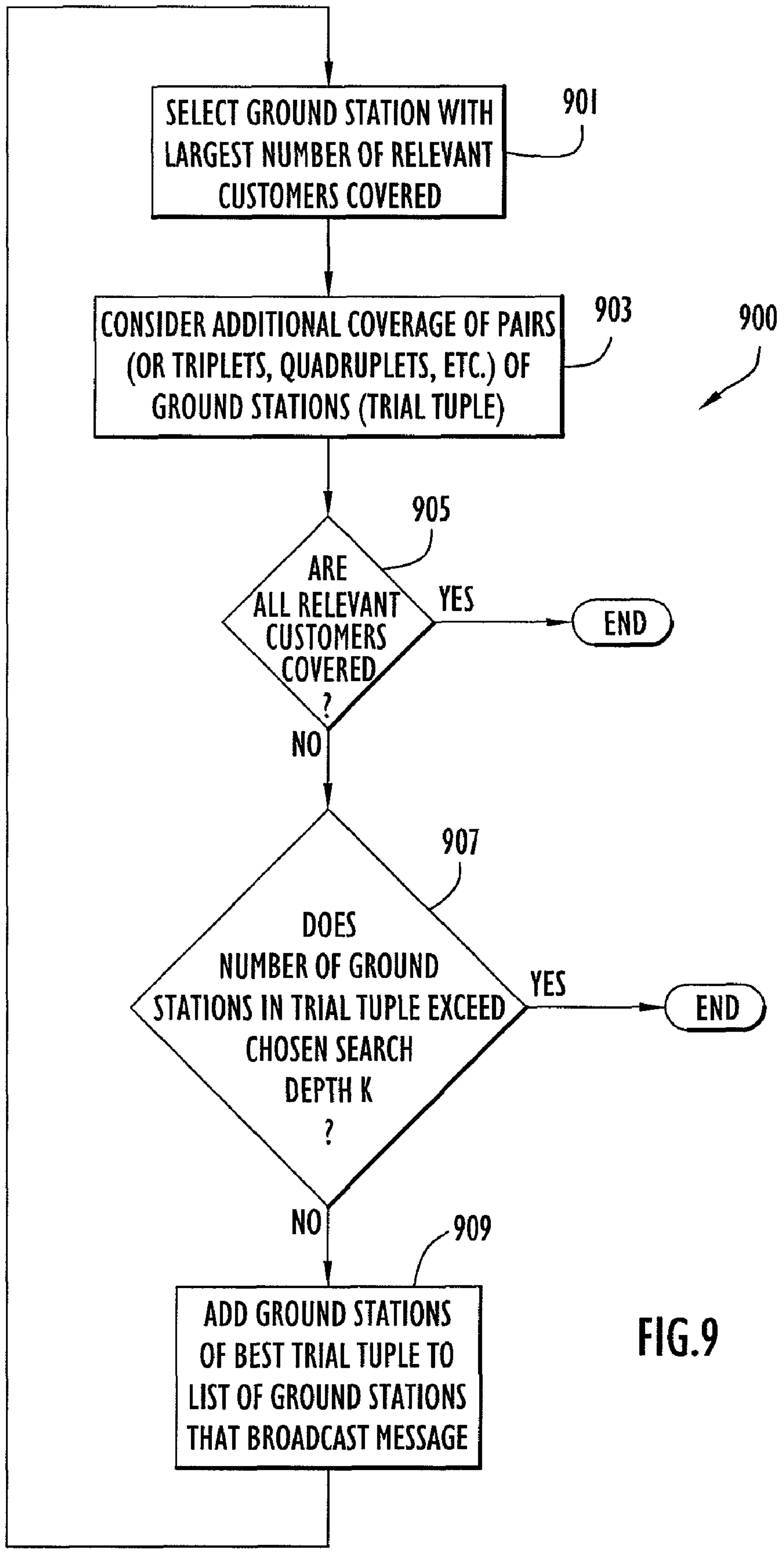

In accordance with this intermediate technique, and as shown in FIG. 9, a process 900 begins at step 901 wherein the ground station with the largest customer coverage is selected.

At step 903, initially, pairs of ground stations are considered. In subsequent iterations of step 903 (assuming subsequent iterations are necessary) the pair of ground stations is increased to triplets, and then quadruplets, etc. These pairs, triplets, etc. are referred to herein as "trial tuples." In accordance with the technique, the trial tuple with the best customer coverage is selected or, if the best coverage of the trial tuple is not better than the coverage of the ground station selected in step 901, then the ground station selected in step 901 is selected.

Process 900 may terminate or a solution is found when:

1. All relevant customers are covered (step 905), or

2. The number of stations in the trial tuple exceeds the chosen search depth k (step 907).

If the best combination in the previous step covers all customers, the problem is solved. If not, the best trial tuple is moved to a list of stations broadcasting the given message and the covered relevant customers are deleted from the list of customers to be covered, as indicated by step 909. Process 900 then returns to step 901.

A length of the foregoing technique may be computed as follows.

$$Q(k,N)=P(k,N)+P(k,N-k)+P(k,N-2k)+P(k,N-3k)+ \quad (3)$$

where P(k,N) is the cost of one search $$P(k,N)=M+\frac{N(N-1)}{2!}+\frac{N(N-1)(N-2)}{3!}+\ldots+\frac{N!}{(N-k)!k!} \quad (4)$$

If N is large, the most important term in equation (4) becomes $N^k/k!$. Accordingly $$Q(k,N)\alpha\frac{N^k}{k!}+\frac{(N-k)^k}{k!}+\frac{(N-2k)^k}{k!}+\ldots\approx\frac{1}{k!}\int_0^{n/k}(N-kx)^k\,dx=\frac{N^{k+1}}{(k+1)!k}$$

If N>>k, then the working time for this technique is proportional to:

$$Q(k,N)\alpha\frac{N^{k+1}}{(k+1)!k},\quad N>>\mathrm{k} \quad (5)$$

Figure 10:
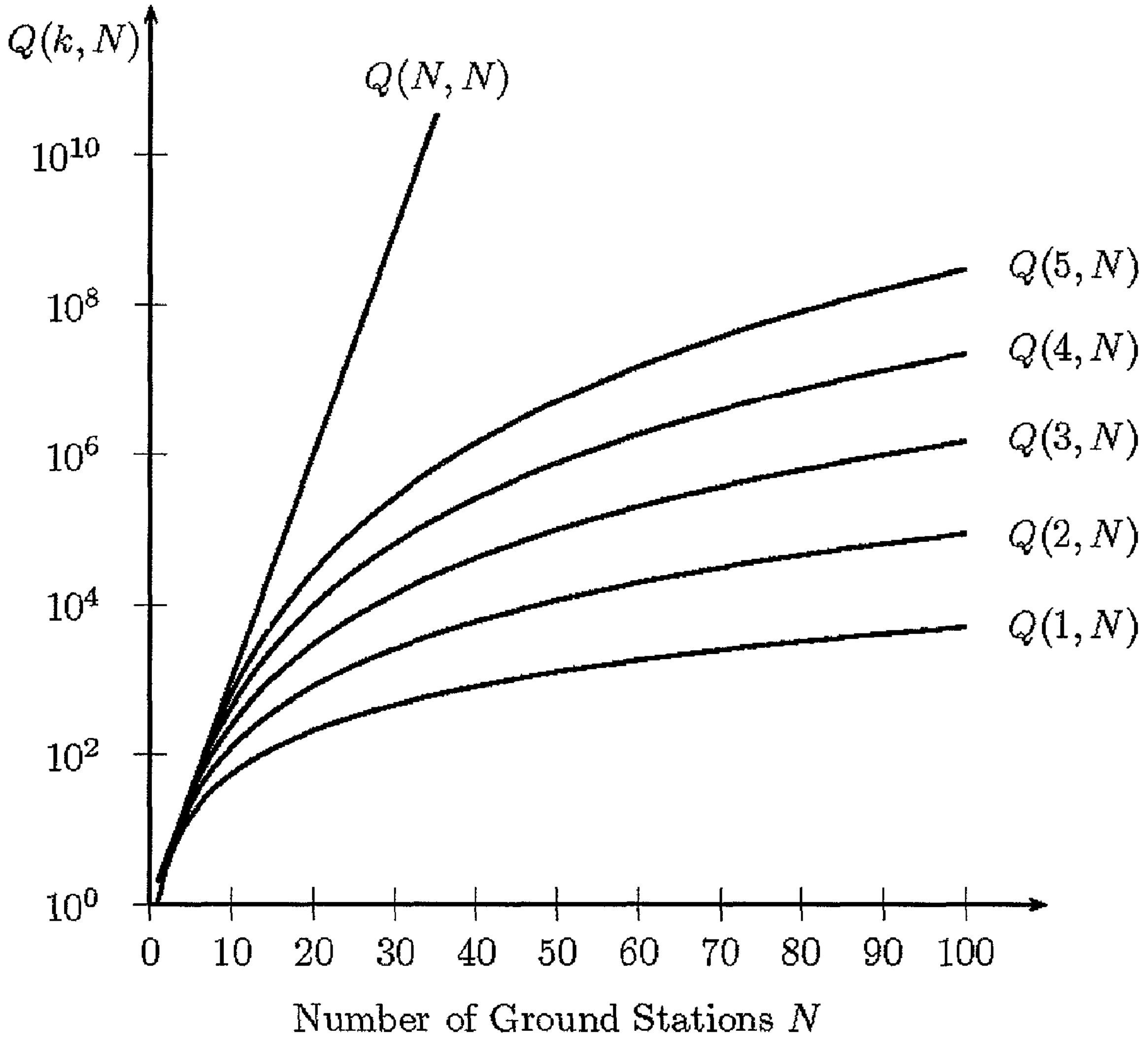
FIG. 10 is a graph depicting a maximal working time for one technique for selecting ground stations in accordance with an embodiment of the present invention.

Exact numerical calculations for Q(k, N) for k≦5 and N≦100 are shown in FIG. 10. For comparison, also plotted are the "optimal" technique (Q(N, N)), and the "fast" technique Q(1,N). As shown, the "optimal" technique is more practical when the number of ground stations is under two dozen, but then quickly becomes prohibitively slow with increasing numbers of ground stations. The "fast" technique is indeed relatively fast even for a large number of ground stations N. The mixed techniques with k>1 can work for intermediate values of N.

Adaptive Algorithm

Still another possible technique is to make k (the search depth) dependent on N. When a set of ground stations is identified, its size N is then known. With this information, it is possible to modify k. More specifically, as ground stations are selected for broadcasting messages, that ground station can be removed from the set of ground stations, thereby reducing N. The relevant customers that receive the broadcasted messages from that removed ground station can also be removed. Then as a further step, remaining ground stations that have zero coverage are also removed.

In accordance with this adaptive technique, N decreases after each step. As a result, it is possible, at the same time, to increase search depth k without significantly impacting the overall timing of the technique.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for broadcasting messages in an Automatic Dependent Surveillance-Broadcast (ADS-B) system, comprising:

detecting that a new target has entered controlled air space;

identifying relevant customers for the new target;

selecting a first set of ground stations comprising ground stations whose broadcast message transmissions can be satisfactorily received by each of the relevant customers;

computing a second set of ground stations from, at least, the first set of ground stations, the second set of ground stations comprising fewer ground stations than a number of ground stations in the first set of ground stations, and the second set of ground stations being sufficient to reach all of the relevant customers via broadcasted messages; and broadcasting messages containing information about the new target only from the ground stations in the second set of ground stations.

2. The method of claim 1, wherein detecting that a new target has entered controlled air space comprises receiving an ADS-B transmission from the new target.

3. The method of claim 1, wherein detecting that a new target has entered controlled air space comprises detecting the new target using radar.

4. The method of claim 1, further comprising generating a list of relevant customers for each one of a plurality of targets.

5. The method of claim 1, further comprising performing the method in parallel for a plurality of targets.

6. The method of claim 1, wherein said computing comprises:

(a) selecting, from the first set of ground stations, a ground station with a largest coverage of relevant customers; and (b) determining if said ground station with a largest coverage of relevant customers covers all relevant customers.

7. The method of claim 6, further comprising:

(c) selecting, from the first set of ground stations, a pair of ground stations with a largest coverage of relevant customers; and (d) determining if said pair of ground stations with a largest coverage of relevant customers covers all relevant customers.

8. The method of claim 1, wherein said computing comprises:

(a) selecting, from the first set of ground stations, a ground station with a largest number of relevant customers covered;

(b) adding said ground station with a largest number of relevant customers covered to a list of ground stations to broadcast messages; and (c) determining if said ground station with a largest number of relevant customers covered covers all relevant customers.

9. The method of claim 8, further comprising:

(d) selecting, from the first set of ground stations, a ground station with a next largest number of relevant customers covered;

(e) adding said ground station with a next largest number of relevant customers covered to the list of ground stations; and (f) determining if said ground station with a largest number of relevant customers covered and said ground station with a next largest number of relevant customers covered together cover all relevant customers.

10. The method of claim 1, wherein said computing comprises:

(a) establishing a first search depth k that represents a number of grounds stations to be considered together in determining relevant customers covered;

(b) selecting, from the first set of ground stations, a ground station with a largest number of relevant customers covered;

(c) selecting, from the first set of ground stations, a number of ground stations in accordance with first search depth k and identifying relevant customers associated with said number of ground stations in accordance with first search depth k; and (d) determining if the relevant customers covered by said ground station with a largest number of relevant customers covered and said number of ground stations in accordance with first search depth k together cover all relevant customers.

11. The method of claim 10, further comprising determining whether the first search depth k is greater than a predetermined value.

12. The method of claim 10, further comprising incrementing a value of the first search depth k to provide a second search depth k and repeating steps (b)-(d) with the second search depth k.

13. The method of claim 10, further comprising dynamically adjusting the first search depth k based on a number of ground stations in the first set of ground stations.

14. A method for determining a subset of ground stations from a plurality of ground stations to broadcast messages about a target aircraft, comprising:

for a selected target aircraft, identifying a plurality of relevant customers that should receive information about the target aircraft;

identifying a first set of ground stations comprising ground stations that can be satisfactorily heard by the relevant customers;

generating a second set of ground stations by selecting, from the first set of ground stations, only those ground stations that are needed to reach all of the relevant customers; and broadcasting the messages about the target aircraft using only the ground stations in the second set of ground stations.

15. The method of claim 14, wherein identifying a plurality of relevant customers comprises determining whether the selected target aircraft is located within a predefined volume around potential customers.

16. The method of claim 14, further comprising performing the method parallel for multiple targets.

17. The method of claim 14, wherein the messages are Automatic Dependent Surveillance-Broadcast (ADS-B) messages.

18. The method of claim 14, wherein generating a second set of ground stations comprises:

(a) selecting, from the first set of ground stations, a ground station with a largest coverage of relevant customers; and (b) determining if said ground station with a largest coverage of relevant customers covers all relevant customers.

19. The method of claim 18, further comprising:

(c) selecting, from the first set of ground stations, a ground station with a next largest number of relevant customers covered; and (d) determining if said ground station with a largest number of relevant customers covered and said ground station with a next largest number of relevant customers covered together cover all relevant customers.

20. The method of claim 14, further comprising:

(c) selecting, from the first set of ground stations, a pair of ground stations with a largest coverage of relevant customers; and (d) determining if said pair of ground stations with a largest coverage of relevant customers covers all relevant customers.

21. The method of claim 14, wherein said generating a second set of ground stations comprises:

(a) establishing a first search depth k that represents a number of grounds stations to be considered together in determining relevant customers covered;

(b) selecting, from the first set of ground stations, a ground station with a largest number of relevant customers covered;

(c) selecting, from the first set of ground stations, a number of ground stations in accordance with first search depth k and identifying relevant customers associated with said number of ground stations in accordance with first search depth k; and (d) determining if the relevant customers covered by said ground station with a largest number of relevant customers covered and said number of ground stations in accordance with first search depth k together cover all relevant customers.

22. The method of claim 21, further comprising determining whether the first search depth k is greater than a predetermined value.

23. The method of claim 21, further comprising incrementing a value of the first search depth k to provide a second search depth k and repeating steps (b)-(d) with the second search depth k.

24. The method of claim 21, further comprising dynamically adjusting the first search depth k based on a number of ground stations in the first set of ground stations.

25. A system for controlling which of a plurality of ground station should broadcast Automatic Dependent Surveillance-Broadcast (ADS-B) messages, the system comprising:

a plurality of interconnected ground stations; and a controller in communication with each of the ground stations, the controller configured to:

detect that a target has entered controlled air space;

identify relevant customers for the target;

select a first set of ground stations from the plurality of interconnected ground stations, the first set of ground stations comprising ground stations whose broadcast message transmissions can be satisfactorily received by each of the relevant customers; and compute a second set of ground stations from, at least, the first set of ground stations, the second set of ground stations comprising fewer ground stations than a number of ground stations in the first set of ground stations, the second set of ground stations being sufficient to reach all of the relevant customers via broadcasted messages.

26. The system of claim 25, further comprising a database in communication with the controller.

27. The system of claim 25, wherein the controller is further configured to identify relevant customers by determining whether the target is located within a predetermined volume surrounding a potential customer.

28. The system of claim 27, wherein the predetermined volume is a cylinder.

29. A system for determining a subset of ground stations from a plurality of ground stations to broadcast messages about a target aircraft, comprising:

a controller; and a plurality of grounds stations in communication with at least said controller, wherein said controller is configured to:

for a selected target aircraft, identify a plurality of relevant customers that should receive information about the target aircraft;

identify a first set of ground stations comprising ground stations that can be satisfactorily heard by the relevant customers;

generate a second set of ground stations by selecting, from the first set of ground stations, only those ground stations that are needed to reach all of the relevant customers; and cause the messages about the target aircraft to be broadcast using only the ground stations in the second set of ground stations.

30. The system of claim 29, further comprising a database in communication with said controller.

31. The system of claim 29, wherein the messages are Automatic Dependent Surveillance-Broadcast (ADS-B) messages.

32. The system of claim 29, wherein said controller is further configured to:

(a) select, from the first set of ground stations, a ground station with a largest coverage of relevant customers; and (b) determine if said ground station with a largest coverage of relevant customers covers all relevant customers.

33. The system of claim 32, wherein said controller is further configured to:

(c) select, from the first set of ground stations, a ground station with a next largest number of relevant customers covered; and (d) determine if said ground station with a largest number of relevant customers covered and said ground station with a next largest number of relevant customers covered together cover all relevant customers.

34. The system of claim 29, wherein said controller is further configured to:

(c) selecting, from the first set of ground stations, a pair of ground stations with a largest coverage of relevant customers; and (d) determining if said pair of ground stations with a largest coverage of relevant customers covers all relevant customers.

35. The system of claim 29, wherein said controller is further configure to:

(a) establish a first search depth k that represents a number of grounds stations to be considered together in determining relevant customers covered;

(b) select, from the first set of ground stations, a ground station with a largest number of relevant customers covered;

(c) select, from the first set of ground stations, a number of ground stations in accordance with first search depth k and identifying relevant customers associated with said number of ground stations in accordance with first search depth k; and (d) determine if the relevant customers covered by said ground station with a largest number of relevant customers covered and said number of ground stations in accordance with first search depth k together cover all relevant customers.

36. The system of claim 35, wherein the controller is further configured to increment a value of the first search depth k to provide a second search depth k and repeat steps (b)-(d) with the second search depth k.

37. The system of claim 35, wherein the controller is further configured to dynamically adjust the first search depth k based on a number of ground stations in the first set of ground stations.

* * * * *